(12) United States Patent
Börger

(10) Patent No.: US 8,695,202 B2
(45) Date of Patent: Apr. 15, 2014

(54) METHOD FOR THE PRODUCTION OF A MOULDED PART FROM PLASTIC MATERIAL

(75) Inventor: Herbert Börger, Baudenbach (DE)

(73) Assignee: Thermoplast Composite GmbH, Lagenfeld (DE)

( * ) Notice: Subject to any disclaimer, the term of this patent is extended or adjusted under 35 U.S.C. 154(b) by 797 days.

(21) Appl. No.: 12/681,350

(22) PCT Filed: Sep. 5, 2008

(86) PCT No.: PCT/EP2008/007252
§ 371 (c)(1),
(2), (4) Date: Apr. 1, 2010

(87) PCT Pub. No.: WO2009/046795
PCT Pub. Date: Apr. 16, 2009

(65) Prior Publication Data
US 2010/0227172 A1    Sep. 9, 2010

(30) Foreign Application Priority Data
Oct. 1, 2007 (DE) .......................... 10 2007 047 012

(51) Int. Cl.
B21B 1/46 (2006.01)
(52) U.S. Cl.
USPC ........................................................ 29/527.1
(58) Field of Classification Search
USPC ........................................................ 29/527.1
See application file for complete search history.

(56) References Cited

U.S. PATENT DOCUMENTS

| 4,361,533 A | 11/1982 | Jenks et al. |
| 4,643,857 A * | 2/1987 | Cousin et al. ................ 264/46.6 |
| 5,456,591 A | 10/1995 | Lo et al. |

FOREIGN PATENT DOCUMENTS

| DE | 2153172 | 5/1973 |
| DE | 2229920 | 10/1973 |
| DE | 2021347 C2 | 8/1984 |
| DE | 4337880 A1 | 5/1995 |
| EP | 045 176 A2 | 2/1982 |
| EP | 108 652 A1 | 5/1984 |
| EP | 533524 A1 | 3/1993 |
| FR | 2689811 | 10/1993 |
| JP | 56-099627 A | 8/1981 |
| JP | 58-116372 A | 7/1983 |
| JP | 07-185044 A | 7/1995 |
| JP | 2000288127 A | 10/2000 |
| WO | 2007118643 A1 | 10/2007 |

OTHER PUBLICATIONS

Japanese Notice of Refusal for JP Appln. No. 2010-527340 dated Feb. 19, 2013.

* cited by examiner

*Primary Examiner* — David Bryant
*Assistant Examiner* — Moshe Wilensky
(74) *Attorney, Agent, or Firm* — Browdy and Neimark, PLLC

(57) ABSTRACT

In a method for the production of a molded part based on a plastic profile reinforced by incorporated fibers, with the plastic profile being heated and deformed by means of an outer or inner mold, respectively, the plastic profile is provided, preferably in the longitudinal direction, with strap-like areas which are relatively harder and less flexible at the deformation temperature of the plastic matrix than the plastic matrix itself, thus counteracting a lateral, wave-like displacement of the fibers.

7 Claims, 1 Drawing Sheet

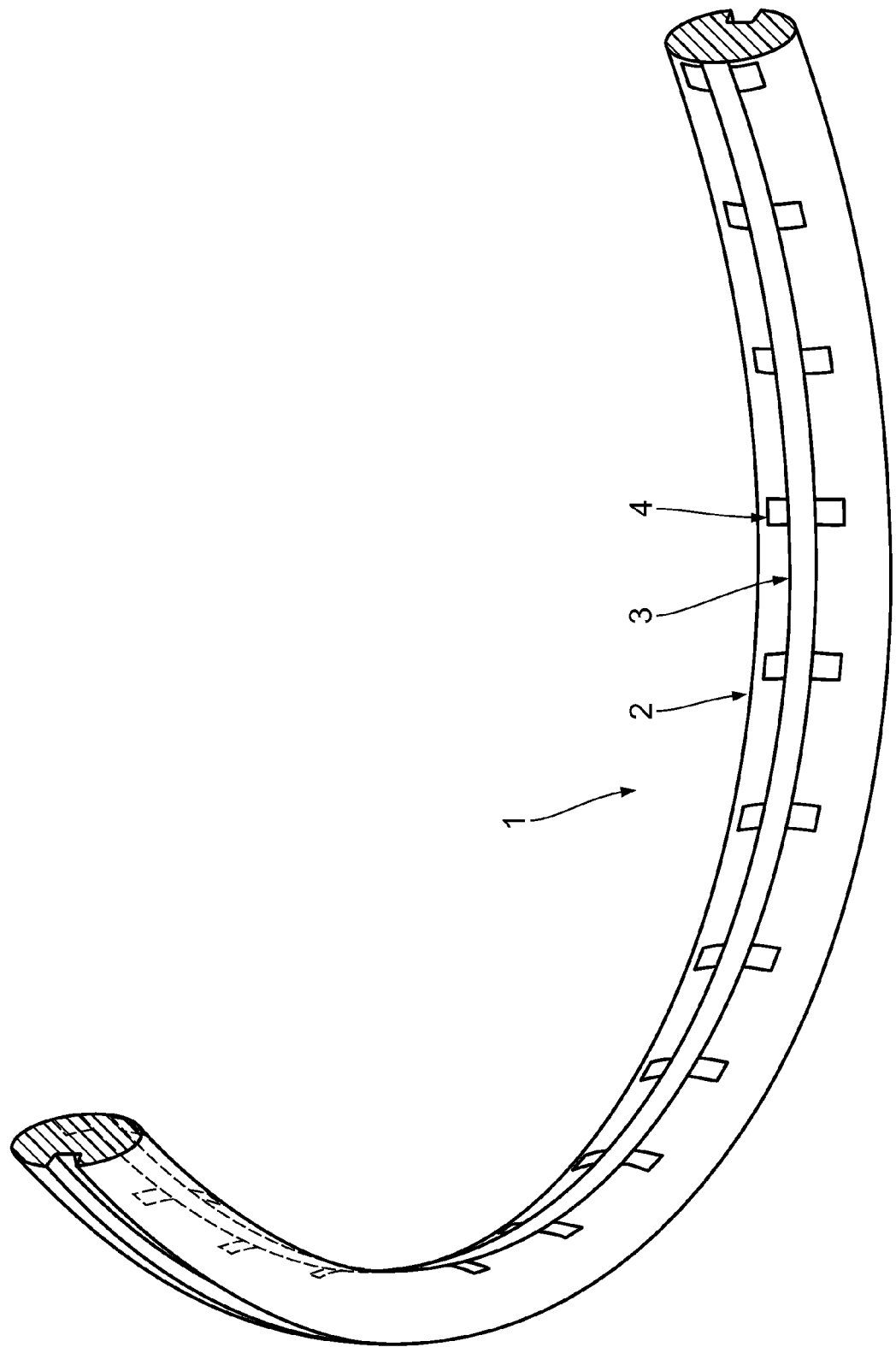

METHOD FOR THE PRODUCTION OF A MOULDED PART FROM PLASTIC MATERIAL

FIELD OF THE INVENTION

The invention relates to a method for the production of a moulded part based on a plastic profile reinforced by incorporated fibres, with the plastic profile being heated and deformed by means of an outer or inner mould, respectively.

BACKGROUND OF THE INVENTION

Such a method is known from PCT/EP2007/003 195.

The known method is in particular suitable for the production of moulded plastic parts having an overall constant curve, such as the head of a tennis racket.

A method for producing a tennis racket frame in which a plastic profile being reinforced with incorporated fibres is heated and deformed by means of an outer mould, is known from EP 0 108 652 A1. Strap-like areas being applied to the lateral front walls in the embodiment according to FIG. 2 of EP 0 108 652 A1, can i.a. have a supporting function and serve as decoration. Such strap-like areas can be produced together with the plastic profile by joint extrusion.

Further moulded parts made of plastic and method for their production are know from EP 0 045 176 A2, Fr 2 689 811 A1, U.S. Pat. No. 5,456,591, WO 2007/118 643 A2 and EP 0 533 524 A1.

SUMMARY OF THE INVENTION

On this basis, it is the object of the invention to develop a method in a way as to provide for the production of even more complex moulded parts in a precise, quick and cost-effective manner.

This object is attained according to the invention by a method for the production of a moulded part based on a plastic profile reinforced by incorporated fibres, with the plastic profile being heated and deformed by means of an outer or inner mould, respectively, wherein the plastic profile is provided with strap-like areas preferably extending in the longitudinal direction which are relatively harder and less flexible at the deformation temperature of the plastic matrix than the plastic matrix itself, thus counteracting a lateral wave-like displacement of the fibres, and wherein the strap-like areas are formed by an incorporated, inner second plastic component in a way that this second plastic component extends entirely or largely around the circumference of the profile, thus forming an interlaminar bond with the plastic matrix when both plastic components are heated up to temperatures above their melting point, for example above 223° C., during the deformation process.

This may be performed by so-called organic sheet profiles on the basis of virtually non-expandable high-performance fibres in the shape of endless fibres having fibre angles of 0° to 90° with reference to the profile axis. The products produced according to the method are distinguished by a particularly high mechanical efficiency at a low weight. Organic sheet profiles containing substantial amounts of axially aligned (0°) fibre orientations, i.e. not consisting of braided structures, are preferably used. During the deformation process in a moulding cavity which forms the outer geometry and is formed by an outer and inner mould, the plastic profile, in the shape of a blank plastic profile, aligns with the wall in a way that the endless fibres remain in a stretched position, thus preventing a buckling or bulging of the fibre bundles in a lateral direction, ensuring that the properties of the organic sheet are preserved even when the deformation process is completed.

According to the invention, reinforcement is not obtained by means of a braided structure, as it is largely the case in the prior art. Such braided structures do not permit a pressure to build up before the mould is closed by means of a pre-pressure, as it may be advantageous within the scope of the invention, as will be explained in the following.

In another embodiment of the invention, it is provided that the strap-like areas are integrated in the plastic profile or are attached thereon and remain inside the plastic matrix or may be removed therefrom when the forming process is completed.

In a first preferred embodiment, it is provided that the strap-like areas are formed by an incorporated, second plastic component which is preferably selected in a way that the glass transition point thereof is just exceeded when the deformation temperature of the plastic matrix is reached.

For example, polyamide 6 having a melting point of 223° C. may be selected for the plastic matrix, and amorphous PES POLYETHERSULPHONE or PES POLYETHERIMIDE having glass transition temperatures of 225° C. or 180° C., respectively, for the second plastic component.

Preferably, the strap-like areas in the plastic profile are arranged in a way as to follow the apex lines of the profile curves during the subsequent thermal deformation process.

In a second embodiment, the strap-like areas may be formed by elastic metal straps extending over an area of less than 1/8 of the circumference of the profile in the circumferential direction.

In particular applications, these elastic metal straps may remain inside the plastic profile even when the deformation process is completed, where they may have a functional purpose, e.g. as a strain gauge, by imparting conductivity, in particular for earthing purposes or lightning protection, or as a rupture sensor.

A third embodiment provides for the strap-like areas to be formed by providing less heating in these areas than in the surrounding areas, thus remaining as a harder frame in relation to the plastic matrix. These harder areas may be formed by means of cooling or shadowing during the heating process.

For this process, it may advantageously be provided that the elongated areas are provided with wider portions in the shape of ribs or webs, respectively, extending in the circumferential direction, the extension of which, in the circumferential direction, amounting to less than 1/8 of the circumference.

In all embodiments described here, it may advantageously be provided that the interior of the plastic profile is acted upon with a pressure of 50 to 500 mbar during the deformation process.

In a variation of the already mentioned method, by using two different plastic components, it is provided that the strap-like areas are formed by an inner, second plastic component in a way that this second plastic component extends entirely or largely around the circumference of the profile, thus forming an interlaminar bond with the plastic matrix when both plastic components are heated up to temperatures above their melting point, for example above 223° C., during the deformation process.

Another variation of the method according to the invention distinguishes itself by the fact that in order to build up an internal mould pressure, the interior of the plastic profile is provided with a temperature-resistant, lightweight foam which remains inside the plastic profile when the deformation process is completed, preferably using a rigid-foam polyethersulphone material in a bulk-density range of 30 to 50 kg/m$^3$.

In the following, the invention is described in more detail by means of an exemplified embodiment, taken in conjunction with the drawing.

BRIEF DESCRIPTION OF THE DRAWINGS

The FIGURE shows a schematic, perspective view of a section of a plastic profile according to the invention.

DETAILED DESCRIPTION

A plastic profile 1 shown in the drawing consists of a plastic matrix 2.

Reinforcing fibres not specifically shown in the drawing extend parallel in the longitudinal direction and are incorporated in the matrix 2.

Moreover, strap-like areas 3 from a second plastic component are incorporated which extend in the longitudinal direction and are provided with transverse webs 4 extending in the circumferential direction. The melting point of the second plastic component is higher than that of the first plastic component, which ensures that when the first plastic component is melted to be deformed, the second plastic component still possesses a residual stability, thus ensuring that a wave-like displacement of the reinforcing fibres during the deformation process is avoided.

The invention claimed is:

1. A method for the production of a molded part comprising:
providing a plastic profile (1), said plastic profile comprising a plastic matrix (2) and strap-like areas (3), wherein the strap-like areas (3) are formed by an incorporated, inner second plastic component at least partially around the circumference of the profile in a plane oriented perpendicularly to a longitudinal direction of the plastic profile (1),
heating the plastic profile (1),
deforming the plastic profile (1) by means of one of the group consisting of an outer mold and an inner mold,
forming an interlaminar bond between the strap-like areas (3) and the plastic matrix (2) when the strap-like areas (3) and the plastic matrix (2) are heated up to temperatures above their melting points during the deformation process,
counteracting a lateral wave-like displacement of fibres by means of the strap-like areas (3) extending in a longitudinal direction, wherein the strap-like areas (3) are relatively harder and less flexible at the deformation temperature of the plastic matrix (2) than the plastic matrix (2) itself.

2. A method for the production of a molded part comprising:
providing a plastic profile (1), said plastic profile comprising a plastic matrix (2), and strap-like areas (3), wherein the strap-like areas (3) are formed by an incorporated, inner second component that extends at least partially around the circumference of the plastic profile (1) in a plane oriented perpendicularly to a longitudinal direction of the plastic profile (1),
heating the plastic profile (1),
deforming the plastic profile (1) by means of one of the group consisting of an outer mold and an inner mold,
forming an interlaminar bond between the strap-like areas (3) and the plastic matrix (2) when the strap-like areas (3) and the plastic matrix (2) are heated up to temperatures above their melting points during the deformation process,
wherein the strap-like areas (3) are formed by elastic metal straps extending in the circumferential direction over an area of less than 1/8 of the circumference of the profile.

3. A method according to claim 2, wherein the elastic metal straps remain inside the plastic profile (1) when the deformation process is completed, where they have a functional purpose such as one of the group comprising a strain gauge, by imparting conductivity, and a rupture sensor.

4. A method according to claim 2, wherein the elastic metal straps remain inside the plastic profile (1) when the deformation process is completed, where they have a functional purpose such as one of the group comprising a strain gauge, by imparting conductivity for either grounding purposes and lightning protection, and a rupture sensor.

5. A method for the production of a molded part comprising:
providing a plastic profile (1), said plastic profile comprising a plastic matrix (2) and strap-like areas (3), wherein the strap-like areas (3) are formed by an incorporated, inner second plastic component extending at least partially around the circumference of the profile (1) in a plane oriented perpendicularly to a longitudinal direction of the plastic profile (1),
heating the plastic profile (1),
deforming the plastic profile (1) by means of one of the group consisting of an outer mold and an inner mold,
forming an interlaminar bond between the strap-like areas (3) and the plastic matrix (2) when the strap-like areas (3) and the plastic matrix (2) are heated up to temperatures above their melting points during the deformation process,
wherein the strap-like areas (3) are formed by providing less heating in these areas than in the surrounding areas, thus remaining as a harder frame in relation to the plastic matrix (2).

6. A method according to claim 5, wherein the strap-like areas (3) are formed by means of one of the group of cooling or shadowing.

7. A method according to claim 5, wherein the strap-like areas (3) are provided with wider portions (4) in the shape of one of the group of ribs or webs, respectively, in the circumferential direction, the extension of which, in the circumferential direction, amounting to less than 1/8 of the circumference.

* * * * *